(No Model.)

W. R. WARDEN.
SEWER AND WASTE PIPE TRAP.

No. 367,686. Patented Aug. 2, 1887.

Witnesses.
E. Planta
J. G. Seltzer

Inventor.
Wm. R. Warden
by J. H. Adams,
Attorney.

UNITED STATES PATENT OFFICE.

WILLIAM R. WARDEN, OF SOMERVILLE, ASSIGNOR OF ONE-HALF TO DANIEL H. BISHOP, OF WEST MEDFORD, MASSACHUSETTS.

SEWER AND WASTE PIPE TRAP.

SPECIFICATION forming part of Letters Patent No. 367,686, dated August 2, 1887.

Application filed September 2, 1886. Serial No. 212,545. (No model.)

*To all whom it may concern:*

Be it known that I, WILLIAM R. WARDEN, a citizen of the United States, residing at Somerville, in the county of Middlesex and State of Massachusetts, have invented a new and useful Improvement in Sewer and Waste Pipe Traps, of which the following is a specification.

The object of my invention is to produce a sewer and waste pipe trap that will always be water-sealed, and which will not siphon out when there is an extra flow of water; and the invention consists in certain details of construction, hereinafter fully described, and pointed out in the claim.

Figure 1:
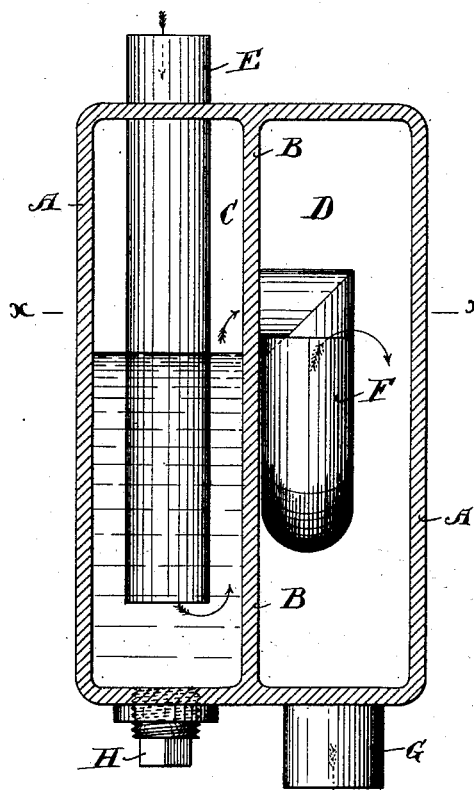
Figure 2:
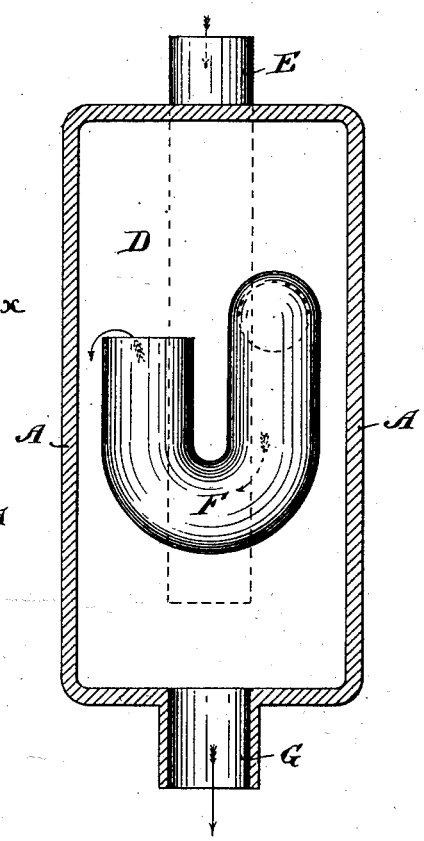
Figure 3:
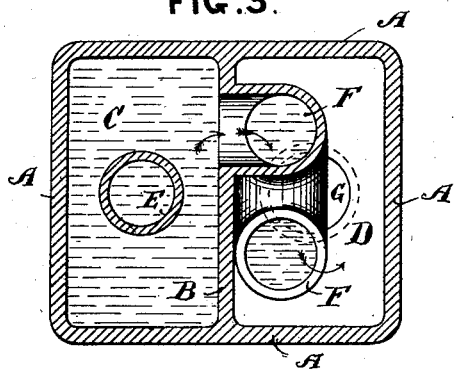

In the accompanying drawings, Figure 1 is a vertical section of a sewer and waste pipe trap embodying my invention. Fig. 2 is a transverse vertical section of the same. Fig. 3 is a horizontal section on line $x$ $x$ of Fig. 2.

A represents a casing, of metal or any suitable composition, divided vertically in the center by a partition, B, so as to form two compartments, C D.

E is a pipe passing through the upper end of compartment C and extending down to within a short distance from the bottom of said compartment. The upper end of pipe E connects with the waste-pipe of a bowl or sink.

The compartment C communicates with the compartment D by means of a bent pipe, F, secured to the partition B at a height from the bottom of the compartments that it is desired to have the water remain in compartment C.

G is a pipe for connecting the trap to the pipe leading to the sewer.

At the bottom of compartment C is a hole provided with a screw-plug, H, so that the said compartment may be cleaned out should any dirt or sediment accumulate therein.

The water from the bowl or sink passes down the pipe E into the compartment C, where it will always remain at a depth, say, of four inches, (more or less,) the surplus water flowing into compartment D through the bent pipe F, and thence through pipe G to the sewer.

It will be seen that the bent pipe F will always remain full of water, thereby effecting one water-seal, and the compartment C, always containing water to the height of the mouth of the pipe F, makes another water-seal, both being independent of each other; and as the pipe F opens into the compartment D, the area of which is much greater than the pipe F, the said compartment cannot become full. The water, as fast as it flows out of pipe F, runs off through pige G, whereby all danger of the water-seals being siphoned off is avoided and sewer-gas effectually prevented from passing through.

My invention, though especially described as applied to bowls and sinks, is equally applicable for all places where it is desired to exclude sewer-gas.

What I claim as my invention is—

A sewer and waste pipe trap divided into two separate compartments, one of the compartments receiving the waste water and forming one water-seal, the said compartment communicating by a U-shaped pipe with the second compartment, and the U-shaped pipe forming another water-seal, the area of the second compartment being much greater than the U-shaped pipe, so that the water-seals will not siphon off, substantially as described.

In testimony whereof I have signed my name to this specification in the presence of two subscribing witnesses.

WILLIAM R. WARDEN.

Witnesses:
J. H. ADAMS,
DANIEL H. BISHOP.